US007892126B2

(12) United States Patent
van Lith et al.

(10) Patent No.: US 7,892,126 B2
(45) Date of Patent: Feb. 22, 2011

(54) TRANSVERSE ELEMENT FOR A DRIVE BELT FOR A CONTINUOUSLY VARIABLE TRANSMISSION

(75) Inventors: Johannes Hendrikus van Lith, Berlicum (NL); Johannes Haaije van der Kamp, Tilburg (NL); Jeroen Herman van Liempd, Bavel (NL)

(73) Assignee: Bosch Transmission Technology B.V. (NL)

(*) Notice: Subject to any disclaimer, the term of this patent is extended or adjusted under 35 U.S.C. 154(b) by 1203 days.

(21) Appl. No.: 10/619,398

(22) Filed: Jul. 15, 2003

(65) Prior Publication Data

US 2004/0072644 A1 Apr. 15, 2004

Related U.S. Application Data

(63) Continuation of application No. PCT/NL02/00005, filed on Jan. 7, 2002.

(30) Foreign Application Priority Data

Jan. 16, 2001 (NL) .................................... 1017122

(51) Int. Cl.
F16G 5/16 (2006.01)
F16C 1/28 (2006.01)

(52) U.S. Cl. ...................................... 474/242; 474/201

(58) Field of Classification Search ......... 474/240–245, 474/249, 272, 237, 201
See application file for complete search history.

(56) References Cited

U.S. PATENT DOCUMENTS 4,526,559 A * 7/1985 Smirl .......................... 474/201
4,824,424 A * 4/1989 Ide et al. ..................... 474/242
5,011,461 A * 4/1991 Brouwers .................... 474/201
6,045,474 A * 4/2000 Smeets et al. ............... 474/249

FOREIGN PATENT DOCUMENTS

| EP | 0 367 620 | A1 | 5/1990 |
| EP | 0 962 679 | A1 | 12/1999 |
| EP | 0 994 275 | A1 | 4/2000 |
| EP | 1130283 | A2 * | 9/2001 |

(Continued)

OTHER PUBLICATIONS

Jun. 5, 2007, JP Office Action On Related JP Application 2002-561218.

*Primary Examiner*—Marcus Charles
(74) *Attorney, Agent, or Firm*—Ryan A. Schneider, Esq.; Troutman Sanders LLP

(57) ABSTRACT

The present invention is a transverse element for a drive belt for a continuously variable transmission. The drive belt includes two endless carriers, wherein transverse elements are continuously arranged along the entire length of the carriers. The transverse elements are on both sides provided with recesses for at least partially receiving the carriers. Furthermore, the transverse elements include supporting surfaces for supporting the carriers, as well as pulley sheave contact surfaces for the purpose of contact between the transverse elements and pulley sheaves of the continuously variable transmission. A convex transition region which has two parts having different curvature radii is situated between a supporting surface and a pulley sheave contact surface, wherein a first curvature radius of a first part at the side of the supporting surface is larger than a second curvature radius of a second part at the side of the pulley sheave contact surface.

21 Claims, 4 Drawing Sheets

FOREIGN PATENT DOCUMENTS

| | | | |
|---|---|---|---|
| JP | 60-26350 U | | 2/1985 |
| JP | 61-162636 U | | 10/1986 |
| JP | 64-22430 A | * | 1/1989 |
| JP | 10-115349 A | | 5/1998 |
| JP | 10-213185 A | * | 8/1998 |
| JP | 63-280946 A | * | 11/1998 ................. 474/242 |
| JP | 11-108123 A | * | 4/1999 |
| JP | 2000-179626 A | | 6/2000 |
| JP | 2000-240745 A | * | 9/2000 |
| JP | 2002-3175940 A | * | 11/2001 |

* cited by examiner

TRANSVERSE ELEMENT FOR A DRIVE BELT FOR A CONTINUOUSLY VARIABLE TRANSMISSION

BENEFIT CLAIM

This application is a continuation of international Application No. PCT/NL02/00005, with an international filing date of 7 Jan. 2002, published in English under PCT Article 21(2), which has priority to NL 1017122, filed 16 Jan. 2001.

BACKGROUND OF THE INVENTION

1. Field of the Invention

The present invention generally relates to a transverse element for a drive belt for a continuously variable transmission.

2. Description of the Related Art

The present invention relates to a transverse element for a drive belt for a continuously variable transmission having two pulleys having an at least partially conical contact surface for pairwise enclosing of the drive belt, each pulley being composed of two pulley sheaves, the drive belt comprising two endless carriers and transverse elements which are placed against each other in axial direction of the drive belt, wherein two subsequent transverse elements are tiltable relative to each other about a contact line, and wherein the transverse elements on both sides are provided with a supporting surface for supporting a carrier, which supporting surface transforms into a pulley sheave contact surface being designed to abut against a contact surface of a pulley sheave, through a transition region.

Such a transverse element is generally known, and is designed for application in a drive belt for a continuously variable transmission. Such a drive belt comprises two bundles of endless bands being shaped like a closed loop, which function as carriers of a number of transverse elements. The transverse elements are continuously arranged along the entire length of the bands, in order for them to be able to transmit forces which are related to a movement of the drive belt during operation.

The transverse elements are on both sides provided with recesses for at least partially receiving the bundles of bands. Further, the transverse elements comprise supporting surfaces for supporting the bundles of bands.

Furthermore, for the purpose of contact between the transverse elements and the pulley sheaves of the continuously variable transmission, the transverse elements on both sides are provided with pulley sheave contact surfaces which are divergent in the direction of the supporting surfaces. A supporting surface and a pulley sheave contact surface being situated at one side of a transverse element are connected to each other through a convex transition region. In the case of known transverse elements, the transition region has the same curvature radius along its entire length.

In case of a relatively small value being chosen for the curvature radius of the transition region, for example 0.3 mm, an advantage is that a relatively large pulley sheave contact surface is obtained. Another advantage is that also a relatively large supporting surface results. However, there are also a number of disadvantages associated with the choice of a relatively small curvature radius.

A first disadvantage is connected to the production process of the transverse elements. The transverse elements are formed from basic products being obtained by means of cutting. In practice, it was found that in case of a relatively small curvature radius of the transition region upsets arise in said region during further process steps, probably as a result of mutual contact between the basic products, or as a result of a finishing process, like in particular tumbling. Transverse elements wherein this is the case can cause damages onto the bands, especially in case of the assembly of the drive belt, wherein the carrier is pushed into a recess of the transverse element along the transition region. Damages to the bands increase the chance of for example breaking of the bands.

A second disadvantage is that a transition region having a relatively small curvature radius is more sensitive to damage than a transition region having a larger curvature radius. This effect is being contributed to by (Hertz) contact tensions which in first order are inversely proportionate to the curvature radius and which can occur in the transition region during finishing processes of the basic products of the transverse elements and during assembly of the drive belt. A damage of the transition region can cause a damage of the bands, as already indicated in the above.

It is true that applying a larger curvature radius for the transition region offers a solution to above-mentioned disadvantages, but in that case, a decrease of the pulley sheave contact surface occurs as important disadvantage.

Another disadvantage is that a decrease of the supporting surface occurs, in a similar manner.

It is an object of the present invention to shape the transition region such that the disadvantages of a small curvature radius are totally or at least partially dissolved, without the occurrence of disadvantages of a large curvature radius. According to the present invention, this object is achieved by providing for a transverse element of the type being mentioned in the first paragraph, which is wherein the transition region comprises two parts having different curvature radii, wherein a first curvature radius of a first part near the side of the supporting surface is larger than a second curvature radius of a second part near the side of the pulley sheave contact surface.

BRIEF SUMMARY OF THE INVENTION

According to the invention, a combination of two curvature radii is applied for the shape of the transition region.

Near the side of the supporting surface, the transition region has a relatively large curvature radius of for example 1.0 mm. As a result, a totally smooth surface will be obtained for the first part of the transition region during a finishing process of the basic products of the transverse elements.

Moreover, damage of the first part will occur less easy. An advantageous effect of this is that the chance of damage of the bands is very small.

Near the side of the pulley sheave contact surface the transition region has a relatively small curvature radius of for example 0.3 mm. Consequently, a relatively large pulley sheave contact surface is obtained.

In an advantageous embodiment of the transverse element according to the invention, the contact line intersects the pulley sheave contact surface. This is advantageous in connection to the stability of the transverse elements during a movement of the drive belt.

In a further advantageous embodiment of the transverse element according to the invention, the pulley sheave contact surface has a surface being corrugated by means of bulges, wherein the pulley sheave contact surface is connected to the second part of the transition region through a bulge. The second part having the relatively small curvature radius then transforms directly into the bulge.

Furthermore, the present invention relates to a drive belt being provided with transverse elements according to the invention, as well as to a continuously variable transmission being provided with said drive belt.

BRIEF DESCRIPTION OF THE FIGURES

The invention will be explained in more detail on the basis of the following description of a transverse element according to the invention with reference to the drawing, in which equal reference signs designate equal or similar parts, and in which:

FIG. 3b is a longitudinal view of a section along the line III$_a$-III$_a$ of the transverse element which is shown in FIG. 3a;

DETAILED DESCRIPTION OF THE PREFERRED EMBODIMENTS

Figure 1:
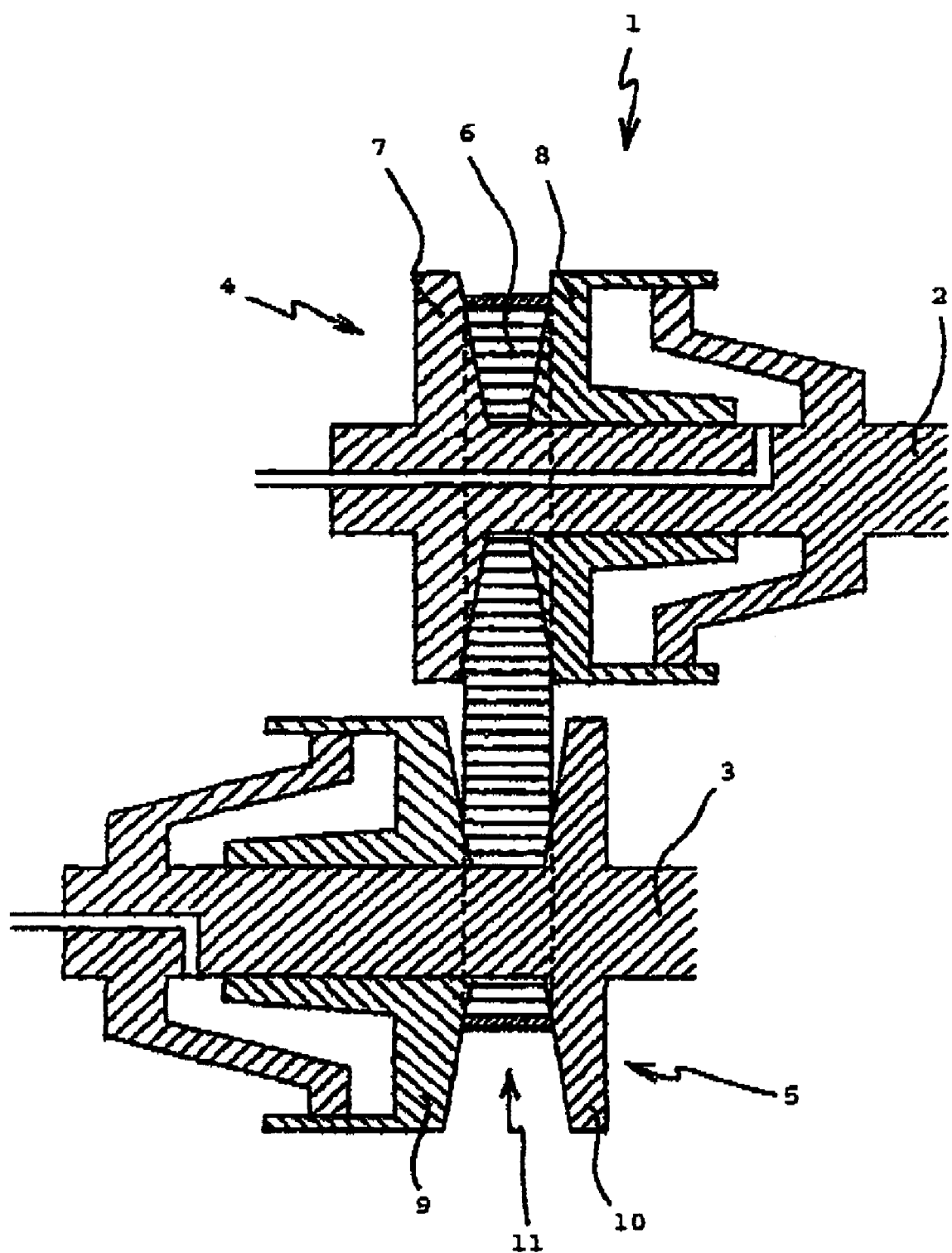
FIG. 1 is a diagrammatical transverse view of a continuously variable transmission having a drive belt.

FIG. 1 shows diagrammatically a continuously variable transmission, such as for utilization in a motor vehicle. The continuously variable transmission is indicated in general by the reference sign 1.

The continuously variable transmission 1 comprises two pulleys 4 and 5 being arranged on separate pulley shafts 2 and 3. An endless drive belt 6 being shaped like a closed loop is arranged around the pulleys 4 and 5 and serves for transmitting torque between the pulley shafts 2 and 3. The pulleys 4 and 5 are each provided with two conical sheaves 7 and 8 respectively 9 and 10, which collectively form a partially conical receiving groove 11 in which the drive belt 6 is received.

The transmission ratio of the continuously variable transmission is determined by the ratio of the running radii of the drive belt 6 in the receiving groove 11 of the pulleys 4 and 5. The running radii can be varied by mutually displacing the pulley sheaves 7 and 8 respectively 9 and 10 with the assistance of displacing means, which are not depicted for the sake of the simplicity. For this purpose, at least one of the pulley sheaves 7 and 8 respectively 9 and 10 is arranged in an axially movable manner. For the purpose of transmitting torque between the pulley shafts 2 and 3, the drive belt 6 is clamped inside the receiving groove 11 of the pulleys 4 and 5 with a certain clamping force.

Figure 2:
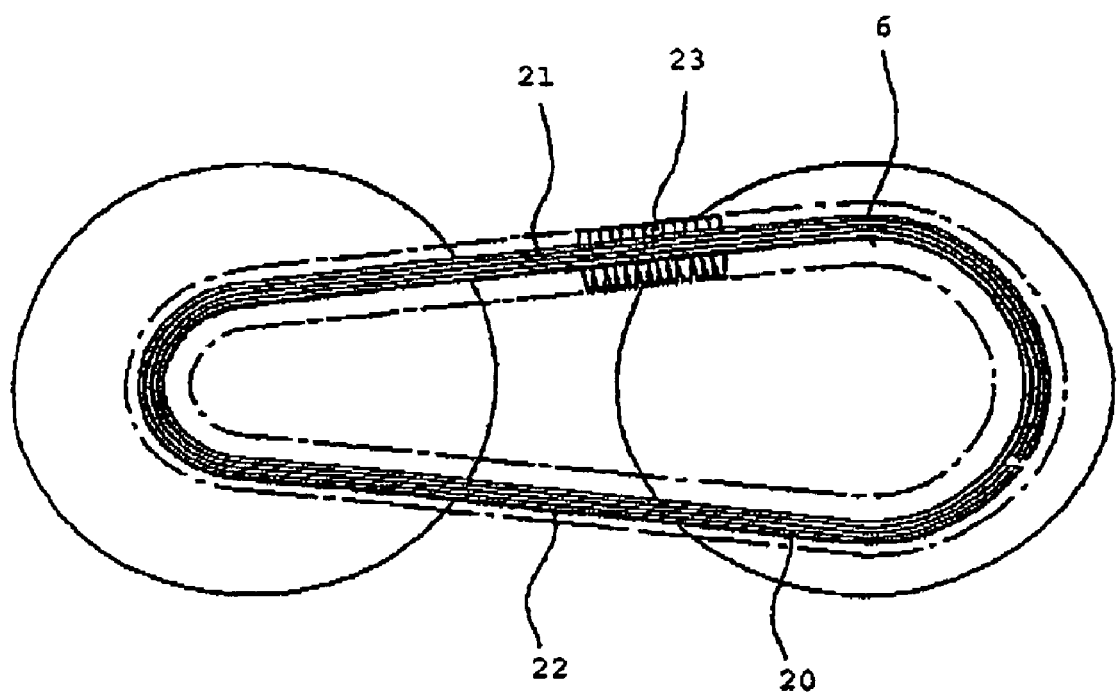
FIG. 2 is a diagrammatical longitudinal view of a part of the transmission having the drive belt, which is shown in FIG. 1.
Figure 3A:
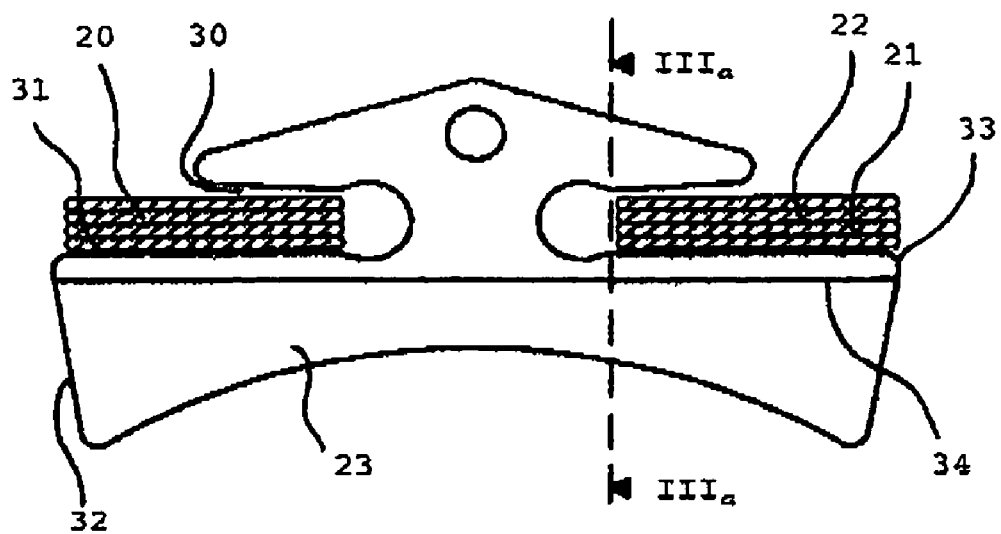
FIG. 3a is a transverse view of a transverse element and carriers of the drive belt.

In FIGS. 2 and 3a, the drive belt 6 is depicted in more detail. The drive belt 6 comprises two endless carriers 20 being disposed next to each other, which in this example are each composed of a number of bands 21 forming a bundle of bands 22. Along the entire length of the carriers 20, transverse elements 23 are arranged, wherein the transverse elements 23 are mutually adjacent to each other and are movable in axial direction relative to the carriers 20. For the sake of the simplicity, in FIG. 2 only a few of these transverse elements 23 are shown.

In FIG. 3a, the carriers 20 and the transverse element 23 are depicted in transverse view. The transverse element 23 is on both sides provided with recesses 30 in which the bundles of bands 22 are partially received. Moreover, the transverse element 23 comprises on both sides supporting surfaces 31 on which the bundles of bands 22 are supported.

Furthermore, the transverse element 23 comprises on both sides pulley sheave contact surfaces 32. When the transverse element 23 is inside the receiving groove, contact between the transverse element 23 and a contact surface of the pulley sheave is established through said pulley sheave contact surface 32. A pulley sheave contact surface 32 and a supporting surface 31 which are situated at one side of the transverse element 23 transform into each other through a transition region 33.

Figure 3B:
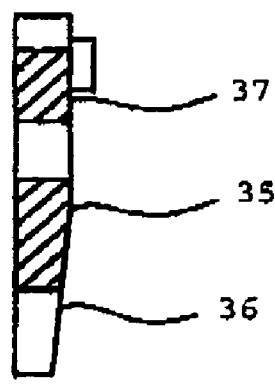

Two subsequent transverse elements 23 are tiltable relative to each other about a contact line 34 which extends between the two transverse elements 23. As is shown in FIG. 3b, the contact line 34 is situated at the position where a slanting part 36 of a back surface 35 of the transverse element 23 is connected to a straight part 37 of said back surface 35. When transverse elements 23 move through, for example, the receiving groove in one of the pulleys during a movement of the drive belt, the mutual contact between two subsequent transverse elements 23 is guaranteed along the contact line 34.

Figure 4A:
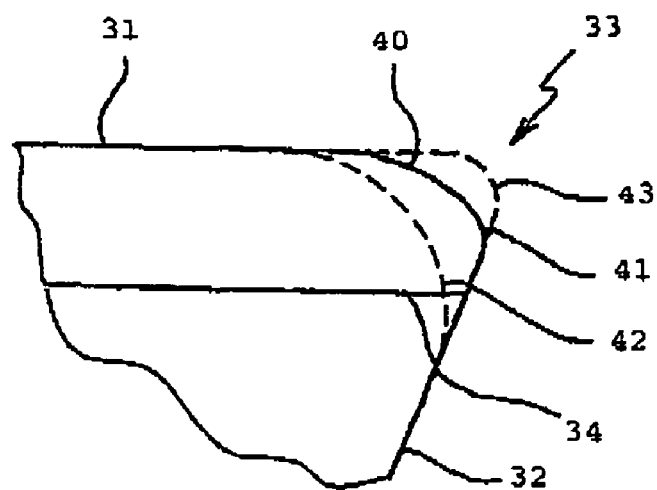
FIG. 4a is a transverse view of a detail of a transverse element according to a first preferred embodiment of the invention.

In FIG. 4a, a detail of the transverse element according to a first preferred embodiment of the invention is depicted. With this, the transition region 33 is shown, and also adjacent parts of on the one hand the supporting surface 31 and on the other hand the pulley sheave contact surface 32.

According to the invention, the transition region 33 comprises two parts having two different curvature radii. With that, a first curvature radius of a first part 40 being situated at the side of the supporting surface 31 is larger than a second curvature radius of a second part 41 being situated at the sight of the pulley sheave contact surface 32.

A suitable value of the first curvature radius is within a range of 0.5 mm to 3.0 mm, wherein, according to the invention, the value of the first curvature radius is higher than the value of the second curvature radius. Preferably, the first curvature radius has a value of 1.0 mm.

Suitably, the second curvature radius is smaller than 1.0 mm, and is in addition smaller than the first curvature radius, according to the invention. Preferably, the second curvature radius has a value of 0.3 mm.

In FIG. 4a, two possibilities of the known shape of the transition region having one curvature radius are depicted through dotted lines. A dotted line being indicated by the reference numeral 42 shows a possibility having a relatively large curvature radius, while a dotted line being indicated by the reference numeral 43 shows a possibility having a relatively small curvature radius. With this, insight is provided on the fact that a large curvature radius relative to a small curvature radius has the advantage that the transition region 33 has a smaller curvature and consequently is less sensitive to damages. This also implies that a large curvature radius relative to a small curvature radius has the disadvantage that the pulley sheave contact surface 32 is smaller. In the shown example of a large curvature radius, the contact line 34 intersects the transition region 33. This has a disadvantageous effect on the stability of the transverse element during a movement of the drive belt. When the transverse element is then inside the receiving groove between a pair of pulley sheaves, the transverse element will sooner be inclined to perform an undesired and disadvantageous tilting movement as a result of the relatively large radial distance between the contact line 34, where during a movement of the drive belt a pushing force is applied between the transverse elements, and an effective point of application on the pulley sheave contact surface 32 of the frictional force which appears between the transverse element and a pulley sheave.

When, in FIG. 4a, the transition region according to the invention is compared to on the one hand a transition region having one relatively large curvature radius and on the other hand a transition region having one relatively small curvature radius, then the advantages of the shape according to the invention appear clearly. By means of the application of two curvature radii, a shape of the transverse element wherein the contact line 34 intersects the pulley sheave contact surface 32 is possible, and wherein the contact line 34 is also situated at relatively small distance from the supporting surface 31, and with that from the carriers of the drive belt.

This contributes in a positive way to the stability of the transverse element during a movement of the drive belt.

Moreover, the first part 40 of the transition region 33 has a relatively small curvature, as a result of which the chance of damage is much smaller than in case of a larger curvature.

Figure 4B:
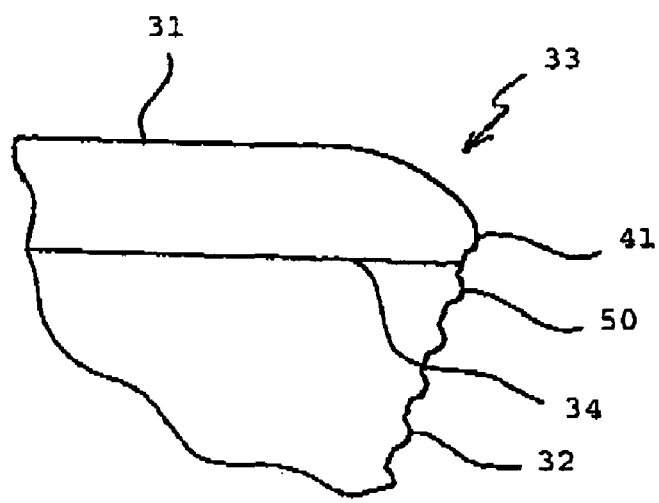
FIG. 4b is a transverse view of a detail of a transverse element according to a second preferred embodiment of the invention.

In FIG. 4b, a detail of the transverse element according to a second preferred embodiment of the invention is depicted.

Just like in FIG. 4a, with this the transition region 33 is shown, and also adjacent parts of on the one hand the supporting surface 31 and on the other hand the pulley sheave contact surface 32.

In this second preferred embodiment, the pulley sheave contact surface 32 has an otherwise known surface being corrugated by means of bulges 50. In this embodiment, the pulley sheave contact surface 32 is designed to contact a contact surface of a pulley sheave through the bulges 50.

Preferably, the pulley sheave contact surface 32 is connected to the transition region 33 through a bulge, as is shown in FIG. 4b. Consequently, the second part 41 of the transition region 33 transforms directly into the bulge. An advantage of this shape is that the pulley sheave contact surface 32 extends beyond the contact line 34 as far as possible.

It will be clear to a person skilled in the art that the scope of the present invention is not limited to the examples discussed above, but that several amendments and modifications thereof are possible without deviating from the scope of the invention as defined in the appended claims.

What is claimed is:

1. Transverse element for a drive belt for a continuously variable transmission having two pulleys having an at least partially conical contact surface for pairwise enclosing of the drive belt, each pulley being composed of two pulley sheaves, the drive belt comprising two endless carriers and transverse elements which are placed against each other in axial direction of the drive belt, wherein two subsequent transverse elements are tiltable relative to each other about a contact line, and wherein the transverse elements on both sides are provided with a supporting surface for supporting a carrier, which supporting surface transforms into a pulley sheave contact surface being designed to abut against a contact surface of a pulley sheave, wherein a convex transition region is defined between the supporting surface and the pulley sheave contact surface and interconnects the supporting surface and the pulley sheave contact surface, and wherein the transition region comprises two parts having different curvature radii, wherein a first curvature radius of a first part at the side of the supporting surface is larger than a second curvature radius of a second part at the side of the pulley sheave contact surface.

2. Transverse element according to claim 1, wherein the contact line intersects the pulley sheave contact surface.

3. Transverse element according to claim 2, wherein the pulley sheave contact surface has a surface being corrugated by means of bulges, wherein the pulley sheave contact surface is connected to the second part of the transition region through a bulge.

4. Transverse element according to claim 3, wherein the first curvature radius is within a range of 0.5 mm to 3.0 mm.

5. Transverse element according to claim 4, wherein the first curvature radius is approximately 1.0 mm.

6. Transverse element according to claim 3, wherein the second curvature radius is smaller than 1.0 mm.

7. Transverse element according to claim 2, wherein the first curvature radius is within a range of 0.5 mm to 3.0 mm.

8. Transverse element according to claim 7, wherein the first curvature radius is approximately 1.0 mm.

9. Transverse element according to claim 2, wherein the second curvature radius is smaller than 1.0 mm.

10. Transverse element according to claim 9, wherein the second curvature radius is approximately 0.3 mm.

11. Transverse element according to claim 1, wherein the pulley sheave contact surface has a surface being corrugated by means of bulges, wherein the pulley sheave contact surface is connected to the second part of the transition region through a bulge.

12. Transverse element according to claim 11, wherein the first curvature radius is within a range of 0.5 mm to 3.0 mm.

13. Transverse element according to claim 12, wherein the first curvature radius is approximately 1.0 mm.

14. Transverse element according to claim 11, wherein the second curvature radius is smaller than 1.0 mm.

15. Transverse element according to claim 1, wherein the first curvature radius is within a range of 0.5 mm to 3.0 mm.

16. Transverse element according to claim 15, wherein the first curvature radius is approximately 1.0 mm.

17. Transverse element according to claim 1, wherein the second curvature radius is smaller than 1.0 mm.

18. Transverse element according to claim 17, wherein the second curvature radius is approximately 0.3 mm.

19. The drive belt for the continuously variable transmission having two pulleys having an at least partially conical contact surface for pairwise enclosing of the drive belt, each pulley being composed of two pulley sheaves, the drive belt comprising two endless carriers and transverse elements according to any of the preceding claims, wherein the transverse elements are placed against each other in axial direction of the drive belt.

20. The continuously variable transmission, provided with the drive belt according to claim 19.

21. Transverse element for a drive belt for a continuously variable transmission having two pulleys having an at least partially conical contact surface for pairwise enclosing of the drive belt, each pulley being composed of two pulley sheaves, the drive belt comprising two endless carriers and transverse elements which are placed against each other in axial direction of the drive belt, wherein two subsequent transverse elements are tiltable relative to each other about a contact line, and wherein the transverse elements on both sides are provided with a supporting surface for supporting a carrier, which supporting surface transforms into a pulley sheave contact surface being designed to abut against a contact surface of a pulley sheave, wherein a convex transition region is defined between the supporting surface and the pulley sheave contact surface and interconnects the supporting surface and the pulley sheave contact surface, and wherein the transition region comprises two parts having different curvature radii, wherein a first curvature radius of a first part at the side of the supporting surface is larger than a second curvature radius of a second part at the side of the pulley sheave contact surface, and wherein the first curvature radius is within a range of 0.5 mm to 3.0 mm.

* * * * *